(12) United States Patent
Salenbien

(10) Patent No.: US 10,809,192 B2
(45) Date of Patent: Oct. 20, 2020

(54) OPTICAL METHODS FOR PHASE CHANGE MATERIALS

(71) Applicant: VITO NV, Mol (BE)

(72) Inventor: Robbe Salenbien, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 16/465,709

(22) PCT Filed: Dec. 21, 2017

(86) PCT No.: PCT/EP2017/084272
§ 371 (c)(1),
(2) Date: May 31, 2019

(87) PCT Pub. No.: WO2018/122133
PCT Pub. Date: Jul. 5, 2018

(65) Prior Publication Data
US 2019/0331596 A1    Oct. 31, 2019

(30) Foreign Application Priority Data
Dec. 28, 2016    (EP) ..................................... 16207184

(51) Int. Cl.
*G01N 21/43*    (2006.01)
*F28D 20/02*    (2006.01)
(Continued)

(52) U.S. Cl.
CPC ......... *G01N 21/431* (2013.01); *F28D 20/021* (2013.01); *G01F 23/2927* (2013.01);
(Continued)

(58) Field of Classification Search
CPC ................. G01N 21/431; G01N 21/84; G01N 2021/432; G01N 2021/433;
(Continued)

(56) References Cited

U.S. PATENT DOCUMENTS 4,187,025 A    2/1980  Harmer
4,287,427 A    9/1981  Scifres
(Continued)

FOREIGN PATENT DOCUMENTS

DE    10314605 A1    2/2004
JP    2010096692     4/2010
WO    8908273 A1    9/1989

OTHER PUBLICATIONS

M. Freund et al., "Paraffin Products", vol. 14, 1st Edition, Editors: G. Mózes, Hardcover ISBN: 9780444997128, eBook ISBN: 9780080868684, Imprint: Elsevier Science, Published Date: Jan. 1, 1983, pp. 1-338.

(Continued)

*Primary Examiner* — Gordon J Stock, Jr.
(74) *Attorney, Agent, or Firm* — Bacon & Thomas, PLLC

(57) ABSTRACT

A device for measuring the state of a phase change material inside a vessel, the device includes at least one optical fiber arranged inside the vessel, the optical fiber including a cladding around a core, a light source emitting light coupled into a first end of the at least one optical fiber at a wavelength λ, optical measuring devices for measuring the amount of light at the output at a second end of the at least one optical fiber. The at least one optical fiber also includes a plurality of sections with the cladding removed so that at these sections the core is in direct contact with the phase change material inside the vessel and where the refractive index at the wavelength λ of the core is higher than that of the phase change material in a first phase and lower in a second phase.

20 Claims, 6 Drawing Sheets

(51) Int. Cl.
*G01F 23/292* (2006.01)
*G01N 21/84* (2006.01)

(52) U.S. Cl.
CPC ....... *G01N 21/84* (2013.01); *G01N 2021/433* (2013.01); *G01N 2021/8405* (2013.01); *G01N 2201/0846* (2013.01); *G01N 2201/127* (2013.01)

(58) Field of Classification Search
CPC ... G01N 2021/8405; G01N 2021/8411; G01N 2021/8416; G01N 2201/0846; G01N 2201/0853; G01N 2201/088; G01N 2201/0886; G01N 2201/0893; G01N 2201/127; F28D 20/021; F28D 20/028; G01F 23/284; G01F 23/292; G01F 23/2921; G01F 23/2922; G01F 23/2927
See application file for complete search history.

(56) References Cited

U.S. PATENT DOCUMENTS

| | | | | |
|---|---|---|---|---|
| 4,851,817 A | * | 7/1989 | Brossia | B64D 15/20 340/583 |
| 4,870,292 A | * | 9/1989 | Alpert | G01F 23/2925 250/577 |
| 4,904,080 A | * | 2/1990 | Afromowitz | G01N 21/4133 250/227.14 |
| 4,913,519 A | * | 4/1990 | Klainer | C03C 13/008 250/227.28 |
| 5,005,005 A | * | 4/1991 | Brossia | B64D 15/20 250/573 |
| 5,065,037 A | * | 11/1991 | Finney | G01F 23/2921 250/577 |
| 5,311,274 A | | 5/1994 | Cole, Jr. | |
| 5,452,076 A | * | 9/1995 | Schopper | G01F 23/292 356/128 |
| 5,956,132 A | * | 9/1999 | Donzier | E21B 47/113 356/133 |
| 6,356,675 B1 | * | 3/2002 | Weiss | G01N 21/431 250/227.14 |
| 7,750,824 B2 | * | 7/2010 | Levine | G08B 19/02 340/962 |
| 8,873,060 B2 | * | 10/2014 | Webb | G01N 33/2847 356/436 |
| 9,134,160 B2 | * | 9/2015 | Ahmad | G01F 15/08 |
| 2003/0169956 A1 | * | 9/2003 | Lange | G01S 7/4811 385/12 |
| 2008/0307860 A1 | * | 12/2008 | Guieze | G01F 5/00 73/61.44 |
| 2009/0034901 A1 | * | 2/2009 | Takabayashi | G01F 23/292 385/12 |
| 2011/0267603 A1 | * | 11/2011 | Shaw | G01N 21/552 356/128 |

OTHER PUBLICATIONS

Entwicklung eines Messverfahrens zur Bestimmung des thermischen Beladungsgrades von PCM-Paraffin-Speichem., by Fischer, Ulrich R., Maschke, Ulrich, Schneider, Jürgen, from BTU, Lehrstuhl Angewandte Physik/Thermophysik, Cottbus, Hannover; 2008.
Relevance Statement of Entwicklung eines Messverfahrens zur Bestimmung des thermischen Beladungsgrades von PCM-Paraffin-Speichem., by Fischer, Ulrich ft, Maschke, Ulrich, Schneider, Jürgen, from BTU, Lehrstuhl Angewandte Physik/Thermophysik, Cottbus, Hannover; 2008.
International Search Report and Written Opinion in corresponding PCT/EP2017/084272, dated Apr. 9, 2018.
European Search Report in corresponding European Application No. 16207184.9-1554, dated Jun. 12, 2017.
International Preliminary Report on Patentability in corresponding PCT/EP2017/084272, dated Jul. 2, 2019.

* cited by examiner

OPTICAL METHODS FOR PHASE CHANGE MATERIALS

FIELD OF THE INVENTION

The present invention pertains to the field of methods and systems for thermal energy storage and of methods and devices for measuring the amount of thermal energy stored in a thermal energy storage that contains phase change materials, as well as a controller for such a thermal energy storage.

BACKGROUND OF THE INVENTION

Phase change materials (PCM) are a type of latent heat storage that are capable of storing and releasing large amounts of energy during the process of change of phase. One such phase change is melting and freezing. Other phase changes can be sublimation from solid to gas, or liquid to gas, i.e. boiling. PCMs typically store 5 to 14 times more heat per unit volume than the more commonly used water storage tanks. Hence PCM materials are particularly attractive because they offer high-density energy storage and store heat within a narrow temperature range.

When considered for usage for space heating or the preparation of domestic hot water, organic PCMs (such as paraffin) offer not only suitable temperature ranges, but high heat of fusion, chemical stability, no health issues, etc. The downside is that they have poor thermal conductivity in their solid state, and they are often costly e.g. due to the costs involved in obtaining reliable phase change points.

PCM storage tanks are intrinsically more expensive than the commonly used water buffer systems. It would be advantageous to find a cost-efficient design of such PCM tanks.

The document «Entwicklung eines Messverfahrens zur Bestimmung des thermischen Beladungsgrades von PCM-Paraffin-Speichern», by Fischer, Ulrich R., Maschke, Ulrich, Schneider, Jurgen, from BTU, Lehrstuhl Angewandte Physik/Thermophysik, Cottbus, Hannover; 2008, discusses several methods for measuring the state of PCM paraffin. The methods include an optical method based on optocouplers. Although the use of optical properties of a PCM can be more accurate when determining the state of a thermal buffer than just a temperature measurement, the optocoupler described in the document only provides a very local measurement, i.e. in a region of a few millimeters. Thus, to obtain an accurate value for a complete buffer a lot of measurements would be required which would mean that a lot of optocouplers would have to be provided inside the vessel comprising the PCM material at various locations. A plurality of optocouplers, with their associated cables, and sealed feedthroughs have to be installed inside the thermal storage vessel increasing the complexity of the design and hence the cost, increasing the possibilities for leaks and increasing the complexity of making many measurements.

U.S. Pat. No. 5,311,274 describes an optical refractometer. It provides a single measurement and is used for measuring the refractive index of a process fluid. The known apparatus does not attempt to measure transmitted light intensity accurately in order to determine the refractive index of a liquid. Instead a parameter is measured upon which the refractive indices of the cladding and core of an optical fibre both depend. A minimum of the transmitted light power intensity is taken as the endpoint.

These solutions require many discrete sensors in a large thermal buffer and thus a significant effort is needed for reading the values from these sensors in order to get an average value.

Using a PCM type of storage tank effectively and efficiently requires a reliable estimate of the energy available, i.e. the state of charge (SoC) of the vessel. In this respect the use of PCMs is associated with several problems. Because of the low thermal conductivity, the change of phase process such as the melting and freezing process does not occur uniformly throughout the vessel. Moreover, if there is a change in volume between these states it can result in pressure induced local cavities, further hindering uniformity. State of charge estimations based on a limited amount of sensors are inaccurate; they cannot take into account this randomness. Some methods have tried to exploit this volumetric difference by linking the pressure to the ratio of molten/solid PCM but they also are unable to register local cavities.

SUMMARY OF THE INVENTION

Embodiments of the present invention provide a detailed storage tank design with innovative and precise methods to determine the energy content, i.e. limiting the amount of system redundancy to be included.

An advantage of embodiments of the present invention is being able to measure an average value for the state of a PCM, e.g. the amount of the two phases such as solid and liquid of a PCM inside an entire vessel which allows a State of Charge (SoC) value to be determined quickly without extensive testing of many sensor readings.

According to an aspect of the present invention, there is provided a heat storage vessel having device for measuring the state of a phase change material inside the heat storage vessel, the vessel comprising
  at least one optical fiber arranged inside the heat storage vessel, said at least one optical fiber having a cladding around a core,
  a light source emitting light coupled into a first end of the at least one optical fiber at a wavelength $\lambda$,
  optical measuring means for measuring the amount of light at the output at a second end of the at least one optical fiber,
wherein the at least one optical fiber comprises one or a plurality of sections with the cladding removed so that at these sections the core is in direct contact with the phase change material inside the vessel and wherein the refractive index at the wavelength $\lambda$ of the core is higher than that of the phase change material in a first phase and lower than that of the phase change material in a second phase. The phase change material is in the heat storage vessel during operation. Alternatively, the PCM material can be supplied on site and the heat storage vessel filled at that time.

The phase change material preferably has a step-wise change of refractive index at change of phase and the refractive index of the core preferably lies within the step-wise change of refractive index at the phase change. This has the advantage that the range of angles over which light beams are totally internally reflected for the PCM in one phase and the range of angles over which the light beams escape the fiber is greater. The step-wise change provides a more reliable result than could be achieved with other types of buffer materials.

The first and second phases can be either liquid or solid phases. This has the advantage that common materials can be used such as paraffin waxes as the PCM.

Due to the non-uniform phase changes such as melting and freezing of the phase change material the fibre cores should best be exposed to said phase change material in a plurality of locations distributed (e.g. in a representative manner) throughout the whole volume of the heat storage vessel in order to provide a significant indication of the state of charge. Preferably, the distribution of fiber sections having a removed/no cladding throughout the heat storage vessel should be such that the ratio of solid to liquid phase change material can be determined by measuring the light intensity at the output of the optical fiber(s). For example, the optical fiber can have no cladding along the trajectory in direct contact with the phase change material. This can increase the sensitivity of the measurement.

The light source can be at least one of a laser light source, a laser diode, a LED or is a coherent light source. The advantage is that common light sources adapted for optical fibres can be used that are made in large quantities, e.g. for telecommunications purposes.

The optical fiber can have at least one section with a vertical trajectory or a plurality of optical fibers are arranged vertically inside the vessel. The sections having a removed cladding can be distributed uniformly throughout the vessel. It is an advantage to have fibres distributed over the volume of the vessel.

The distribution of the sections having a removed cladding is selected depending on the distributions of the first and second phases of the PCM when the PCM is close to the phase change point.

The at least one optical fiber can be arranged inside the vessel such that at least one segment of the fiber has a spiral or helicoidal trajectory in which a section of the optical fiber is removed at a plurality of locations along the segment. Arranging the fibre with bent portions can assist in light exiting the fibre at points where there is no cladding.

A plurality of optical fibers are arranged inside the vessel such that each optical fiber measures the amount of liquid to solid within a dedicated section defined by its height so as to measure the amount of liquid to solid as a function of the height within the vessel. This improves accuracy.

The at least one optical fiber can be configured to receive a light beam at a plurality of wavelengths. Each optical fiber of a plurality of optical fibers can be configured to operate with light sources producing a light beam or beams of different wavelengths. Changing the wavelength of the light can improve accuracy.

At least one temperature sensor can be provided for measuring the temperature of the PCM. This allows a comparison between the optical methods of the present invention and a method based on temperature measurements. To improve accuracy a plurality of temperature sensors can be arranged along a vertical line inside the vessel.

In another aspect the present invention provides a method for calibrating a measurement system for optical measurements on a phase change material in a vessel, the vessel having at least one optical fiber arranged inside the vessel, said optical fiber comprising a cladding around a core, the at least one optical fiber having a plurality of sections with the cladding removed so that at these sections the core is in direct contact with the phase change material inside the vessel and wherein the refractive index of the core is higher than that of the phase change material when the phase change material is in a first phase and lower than that of the phase change material when the phase change material is in a second phase, the refractive index of the core lying within the step-wise change of refractive index of the phase change material at the phase change, the method comprising the steps of coupling a light source to an input of the at least one optical fiber, measuring a maximal intensity of light emitted at an output of the fiber when the phase change material is all in the first phase state, measuring a minimum intensity at the output of the fiber when the phase change material in the vessel is all in a second state, and storing the minimum and maximum intensity values.

The phase change material is in the heat storage vessel during operation.

The phase change material preferably has a step-wise change of refractive index at change of phase and the refractive index of the core preferably lies within the step-wise change of refractive index of the phase change material at the phase change. Due to the non-uniform phase changes such as melting and freezing of the phase change material the fibre cores should best be exposed to said phase change material in a plurality of locations distributed (e.g. in a representative manner) throughout the whole volume of the heat storage vessel in order to provide a significant indication of the state of charge. Preferably, the distribution of fiber sections having a removed/no cladding throughout the heat storage vessel should be such that the ratio of solid to liquid phase change material can be determined by measuring the light intensity at the output of the optical fiber(s).

In another aspect of the present invention a method is provided for calibrating the state of a PCM in a vessel, the method comprising the steps of:

measuring a maximal intensity at the output of the fiber by providing a light beam of coherent light at a first wavelength $\lambda$ and intensity I at the entrance of the fiber, wherein said first wavelength being chosen such that the refraction index of the core is always higher than the refraction index of the cladding or the PCM material, measuring a minimum intensity at the output of the fiber by providing a light beam of coherent light at a second wavelength $\lambda$ and same intensity I at the entrance of the fiber, the second wavelength being chosen such that the refraction index of the phase change material is always larger than the refraction index of the core, storing the minimum and maximum intensity values as a function of the intensity I.

Due to the non-uniform phase changes such as melting and freezing of the phase change material the fibre cores should best be exposed to said phase change material in a plurality of locations distributed (e.g. in a representative manner) throughout the whole volume of the heat storage vessel in order to provide a significant indication of the state of charge. Preferably, the distribution of fiber sections having a removed/no cladding throughout the heat storage vessel should be such that the ratio of solid to liquid phase change material can be determined by measuring the light intensity at the output of the optical fiber(s). For example, A storage vessel equipped with an optical fiber or optical fibers as a distributed sensor will return global values of the state of the entire vessel, compared to the localized measurements that are obtained when using a few temperature sensors. It is also a way to avoid pressure-induced problems in the vessel that make it difficult and expensive to uses pressure sensors.

Other advantages are cheapness to apply, simplicity to control, limited components, no heated parts and no moving parts. It also no longer requires the buffer to be of symmetric design. Classic water tanks are cylindrical for safety reasons, a PCM buffer could have a bespoke shape and fill up obsolete space in e.g. an engine bay of a car.

Also the technique is not very intrusive. In addition, an optical fibre can withstand large temperature variations and different environments, and has a long lifetime. Chances of equipment failure are therefore a lot smaller than e.g. working with an array of temperature sensors. When a large number of discrete sensor elements are used, the output from the sensors may drift with time. Hence measurement of drift or compensation for drift would be advantageous.

Data processing and analysis are also straightforward: there is a direct relation between the intensity of the light source and the liquid/solid ratio.

Optical fibres can be made in long lengths and therefore a complete scan of the buffer vessel can be performed instead of obtaining a large number of values from spatially limited (localised) temperature measurements.

The technical effects and advantages of embodiments according to the present invention correspond mutatis mutandis to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DETAILED DESCRIPTION OF EMBODIMENTS THE INVENTION

Figure 1:
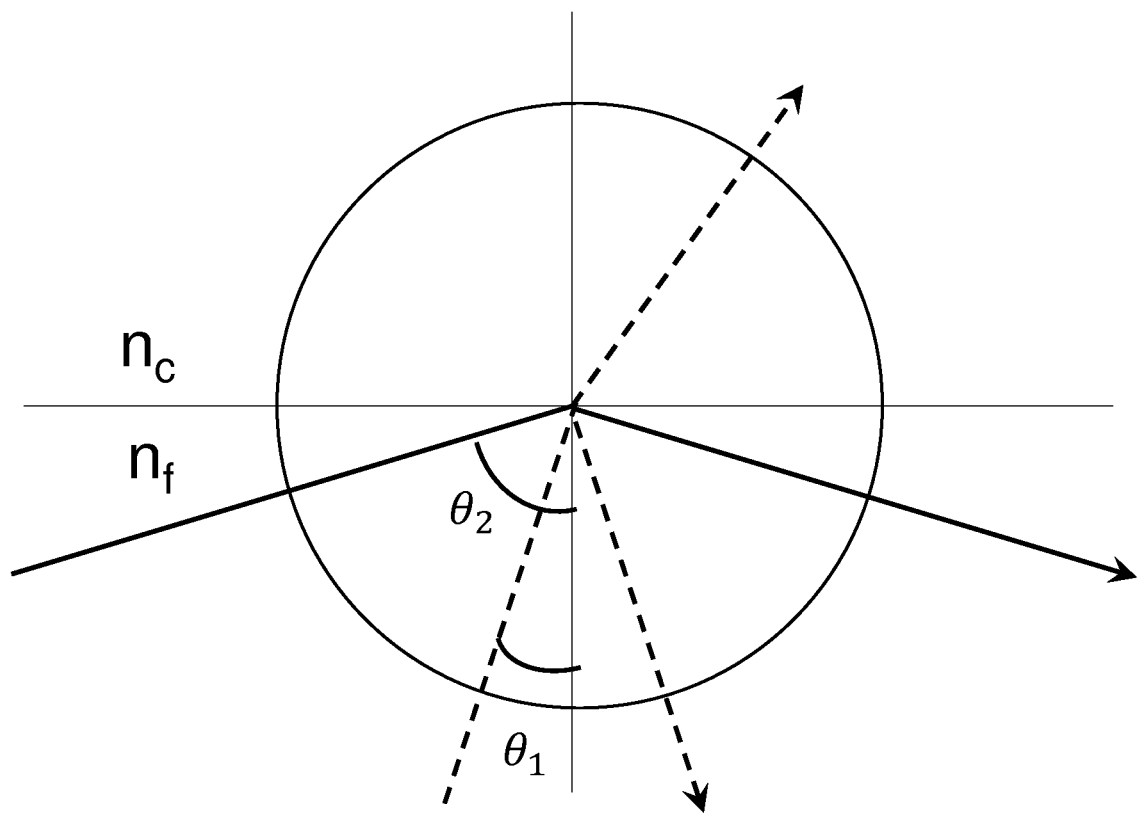
FIG. 1 is a schematic representation showing a light beam being refracted and a light beam enduring total internal reflection.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The aim of the present invention is to exploit the changes in optical characteristics of a phase changing material undergoing a phase change process in order to quantify the state of charge of the material, i.e. the amount of thermal energy stored.

The present method allows to obtain information on the temperature distribution inside the vessel resolved spatially but also in time.

The spatial resolution depends on the arrangement of the fibers inside the vessel and their configuration. It further allows to obtain an average value of the state of the entire vessel by recording an average value for the amounts of two phases of the material, e.g. the amount of solid to liquid present in the vessel.

An optical fiber usually comprises a core surrounded by a cladding for guiding the light down the core. The cladding is coated by a buffer that protects it from moisture and physical damage, which may be further surrounded by a jacket layer, usually plastic. An optical fiber is a cylindrical dielectric wave guide transmitting light along its axis and is governed by the process of total internal reflection, which occurs due to the difference in refractive index between the core of the fiber and the cladding, i.e. the refractive index of the cladding has to be lower (typically by an amount of about 0.3%) than that of the core in order to confine the optical wave in the core. Examples of refractive indices for a core of a fiber $n_f$ and its cladding $n_c$ are $n_f=1.46$ and $n_c=1.44$. The cladding and the core are made of dielectric materials.

FIG. 1 illustrates the known principle of total internal reflection, which is a consequence of Snell's law.

When a wave reaches a boundary between two different materials having different optical properties such as different refractive indices ($n_c$ and $n_f$), the wave will in general be partially refracted at the boundary surface, and partially reflected. However, if the angle of incidence is greater than a critical angle the wave will not cross the boundary, but will instead be totally reflected back internally.

The critical angle depends on the refractive indices of the two mediums and is calculated as $$\theta_c = \arcsin\left(\frac{n_c}{n_f}\right).$$

It follows that when $n_c > n_f$, the critical angle is not defined.

Thus, the refractive index of the cladding has to be smaller than the refractive index of the core for there to be internal reflection and allow light to travel with almost no loss within the optical fiber.

The book "Paraffin Products", Volume 14, 1st Edition, Editors: G. Mózes, Hardcover ISBN: 9780444997128, eBook ISBN: 9780080868684, Imprint: Elsevier Science, Published Date: 1 Jan. 1983, shows how the refractive index of paraffin waxes can be utilized to a certain extent for studying the crystal structure of paraffin waxes (see page 103). In fact, the book not only shows the dependence of the refractive index on the crystal structure but also on the phase state.

In the solid state, at temperatures between 10 and 50° C., the refractive indices of some macrocrystalline paraffin waxes vary between 1.5049 and 1.5366.

In the liquid state, at temperatures of 84° C., the refractive indices of macrocrystalline paraffin waxes vary between 1.4210 and 1.4315.

Figure 2:
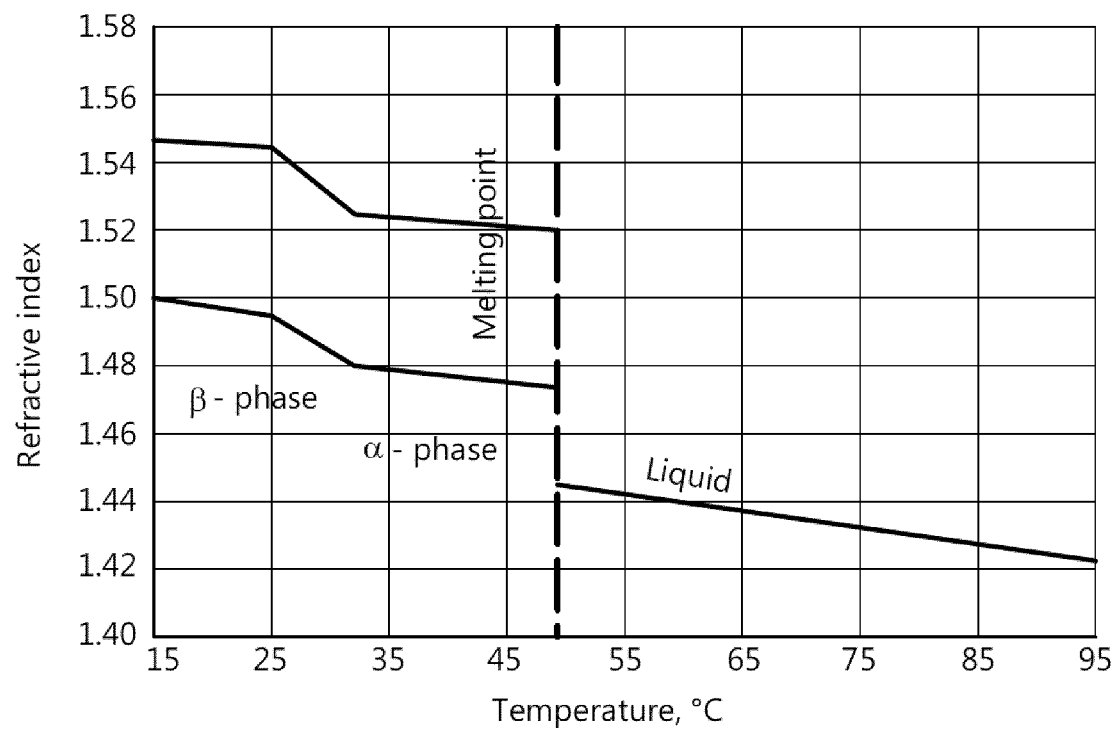
FIG. 2 shows the refractive index as a function of temperature for a macrocrystalline paraffin wax.

FIG. 2 shows a graph which illustrates the refractive indices as a function of the temperature around the melting point (48° C.) of a macrocrystalline paraffin wax. In the solid state, the refractive index is greater than 1.46 whereas in the liquid state, the refractive index is smaller than 1.46.

In general, the optical properties of phase change materials such as their refractive indices show an abrupt variation during the phase transition. The refractive index of the core of the optical fibre is preferably selected so that it lies within the step-wise change of refractive index of the phase change material at the phase change.

The physical principle underlying the present invention is to remove at least one location and optionally at many positions along the optical fiber a section of the cladding (and the jacket and the buffer) of the optical fiber. As a result, when the modified optical fiber is placed inside a phase change material (PCM) the core of the fiber is surrounded by the PCM and is in direct contact with the phase change material (PCM). Removing the cladding so that there is a plurality of positions with exposed core is used in embodiments of the present invention to obtain a general value of the ratio of the amount of solid to liquid in the PCM. The plurality of exposed parts of the core can be obtained by removing a plurality of cladding sections from one optical fibre or by preparing a plurality of optical fibres with one section where the cladding has been removed. As light will be propagated along the fibre at places where the cladding has been removed when the refractive index of the PCM material is lower than the core and light will be lost from the optical fibre sections without cladding when the refractive index of the PCM material is higher when the PCM has changed phase, how much light is lost and how much light is propagated relates to the amount of PCM material in one phase or the other. It is also possible to use a fiber without cladding, which would provide a value representative over the entire trajectory of the fiber inside the PCM.

The size of the portion of cladding removed is selected depending upon the materials used. Photons that are not travelling perfectly along the fiber axis will hit the fiber edge. Depending on the refractive index, they will (partially) escape the fiber. So with each collision that is not total internal reflection, some light escapes. The shorter the cladding-less section, the fewer of these collisions will happen. For some fibres the refractive index varies (decreases from core to edge). As a result, this variation gradually re-aligns the photon trajectory with the fiber axis. In such a situation cladding has to be removed over a larger length. The fibre can be bent at the point where cladding is removed to increase the possibility that light escapes. For example the fibre may be clamped at a radius by a simple clamp. Or if, desired, the fibre may be kept straight by a splint at the point the cladding is removed in order to reduce the amount of light that is lost from the fibre.

At the entrance of the fiber, a suitable light source 10 (see FIG. 3 but also used in all other embodiments e.g. as shown in and described with respect to FIGS. 4 to 6) such as a solid state light source is arranged to couple light from the source into the fiber 18 in the vessel 16 having a PCM filling 14. Such a light source can be a coherent light source, such as a laser or a laser diode. Light emitting diodes may also be used as the light source. Coherent sources tend to travel further unscattered and this could be required to avoid wave interference. As long as the light losses along the trajectory of the fiber are related to the PCM 14 and not to negative interference or scattering for example, and provided that light from any light source used travels throughout the fiber, any difference in intensity obtained should be related to a difference in amounts of PCM in each phase. The following types of light sources may further be used: LED, polarized/nonpolarized light sources. The type of light source also is preferably adapted to the type of optical sensor used, as described below.

The propagation of the light throughout the optical fiber will, depending on the refractive index around the section of removed cladding, either continue to propagate by total internal reflections, or will be refracted and thereby induce light losses from the core of the optical fiber depending upon the difference in refractive index of the PCM in the two phase, e.g. solidified or frozen, or molten and liquid.

The macrocrystalline paraffin wax shown on FIG. 2, has an index of refraction of for example 1.48 in the solid state and 1.44 in the liquid state. If the refractive index of the core material is chosen to be of for example 1.46, when the paraffin wax is in the solid state, there is no total internal reflections within the core and thus light losses occur at sections of the core without cladding. When the paraffin wax is in the liquid state, the conditions for total internal reflections are fulfilled.

All embodiments of the present invention can make use of the step-wise change of refractive index at the phase change point of the PCM. As the critical angle depends on the refractive indices of the two mediums, the amount of light that is totally internally reflected depends on the difference in refractive index. Thus if the change of refractive index is gradual, the amount of light escaping from a section of fibre without cladding varies with the difference in refractive index. By making use of the step-wise change of refractive index of the PCM at phase change and selecting the core refractive index to lie close to the middle value of the refractive index step, this difficulty can be removed. This provides a more reliable method than could have been expected from traditional thermal buffer materials.

By measuring the intensity of the light at the exit of the optical fiber with optical measuring means 20 (see FIG. 3 but also used in all other embodiments e.g. as shown in and described with respect to FIGS. 4 to 6) such as an optical sensor, the amount of light losses can be measured and thus, the amount of light lost into the PCM material can be determined. From this the amounts of solid and liquid phases of the phase change material can be derived. However, the measurement is not limited to the amount of solid to liquid of the PCM, it can also measure the temperature, as the refractive index varies with the temperature.

In a preferred embodiment according to the present invention, the optical measuring means 20 comprise a photosensitive diode. Other sensors can be used.

The measuring means can be implemented with a digital device such as controller with processing capability including one or more microprocessors, processors, microcontrollers, or central processing units (CPU) and/or a Graphics Processing Units (GPU) adapted to carry out the respective functions programmed with software, i.e. one or more computer programs. The software can be compiled to run on any of the microprocessors, processors, microcontrollers, or central processing units (CPU) and/or a Graphics Processing Units (GPU).

Such a device may be a standalone device or may be embedded in another electronic component. The device has memory (such as non-transitory computer readable medium, RAM and/or ROM), an operating system, optionally a display such as a fixed format display such as an OLED display, data entry devices such as a keyboard, a pointer device such as a "mouse", serial or parallel ports to communicate with other devices, network cards and connections to connect to a network.

The software can be embodied in a computer program product adapted to carry out the functions to calculate the ratio of the amount of PCM in one phase to the amount in another and also to calculate the State of Charge of the vessel 16, when the software is loaded onto the respective device and functions explained below are executed on one or more processing engines such as microprocessors, ASIC's, FPGA's etc. These computer based methods can be applied to a system having one or a plurality of thermal energy storage vessels 16 with a PCM filling 14.

In order to measure the amount of solid to liquid in the PCM material, a method according to embodiments of the present invention determines the maximum intensity in the case when the light propagating throughout the optical fiber is internally reflected within the fibre. This corresponds to the case where all the PCM is in one state, e.g. the liquid state. It is also preferred to determine the minimum amount of light intensity which corresponds to the case where the PCM material is in the other state, e.g. the solid state, i.e. there is no internal reflection within the sections in direct contact with the PCM. The use of a coherent beam, such as a lasers, which have a very low étendue, are preferred as they provide a bigger difference in intensity between the first and the second phase.

Knowing the minimum and maximum measurable intensity by the optical measuring means 20 at the output of the optical fiber, a measurement of the intensity in an intermediary state provides an indication of the amount of solid to liquid of PCM in the vessel. Note that if there are a sufficient number of sections with exposed care, this measurement corresponds to an average along the trajectory of the optical fiber. The sections with exposed core can be provided by many optical fibres with one section of cladding removed or one or a few fibres with several sections of cladding removed.

Before starting measuring the phase change materials, each optical fiber is preferably calibrated. One calibration procedure is described below.

Phase change materials are stored in a vessel and their phase state is usually measured with a temperature sensor as discussed in the prior art section. In a preferred embodiment according to the present invention, the optical fiber is long enough or there are many optical fibres so as to span the entire thermal storage vessel. Advantageously, the optical fiber has the cladding removed for limited distances at a plurality of locations along the optical fiber so as to allow light to leave the fibre core at positions distributed over the fibre when the PCM is in one of its states and to be totally internally reflected when the PCM is in the other state. Alternatively many fibres of different lengths can be used with only one section of cladding removed. Assuming that there is a mix of states of the PCM in the vessel then some but not all light will reach the end of the fibre or fibres and some light but not all will leave the fibre or fibres and the amounts of each will depend upon how much of the PCM is in each state in the vessel. Thus the amount of light coupled into the fibre or fibres and the amount of light measured at the other end of the fibre or fibres can give an indication of how much of each phase of PCM material is in the vessel. A value of ratio of the amount of solid to liquid of the phase change material can be derived from how much light has been lost at the locations distributed over the fiber or fibres where the cladding has been removed. Hence the measurement of the exit light can be used to derive an average value of the amount of solid to liquid of the phase change material within the entire vessel. Increasing the number of sections where the core is in contact with the phase change material can improve the measurement of the average value of the amount of solid to liquid within the phase change material up to a certain point.

A calibration of the system can be made by:

a) bringing all of the PCM material in a vessel into a first phase state and measuring the exit light E1 from an optical fibre or fibres. If the exit light is very weak the amount of light coupled to the fibre or fibres can be increased.

b) heat or cool all of the PCM material so that it is all in the second phase state and measure the exit light again E2 from the optical fibre or fibres.

Any actual measurement of exit light E3 will be between E1 and E2. The ratio of PCM material in each state at any intermediate value can be determined by a comparison between E3, E1 and E2, e.g. by interpolation between E1 and E2. To improve the accuracy of interpolation measurements can be made at known states of charge or can be combined with a classical way of measuring State of Charge from the measured temperature or temperatures of the PCM.

In a preferred embodiment according to the present invention, the sections without cladding are distributed throughout the vessel, or within the phase change material preferably distributed uniformily.

The amount of first or second phase, e.g. solid and liquid near the melting point of the PCM may not be uniformly distributed inside the vessel, and therefore the locations of the sections in direct contact with the PCM may have to be adapted to the distribution of solid to liquid within the PCM material in the vessel. An example of such a non-uniform distribution is ice and water, wherein ice floats on top of the water. Another example is the stratification which occurs in hot water heat storage tanks. In the case of Paraffin wax, the solid phase will tend to remain in the bottom of the vessel.

To traverse the space of the PCM vessel, the optical fibre may extend from the top to the bottom in many loops. Or the optical fibre may be laid on trays at different heights, e.g. a spiral of optical fibre on each tray or arranged in helicoidal form.

It may be preferable to provide a plurality of optical fibers each arranged within a section of the vessel, each section of the vessel being defined by its height. The light transmission through the optical fiber or fibres would then give an indication of the amount of solid to liquid of the PCM in a given section defined by the height of the fibres or fibre in the vessel. Such an arrangement is illustrated on FIG. 6 wherein the vessel 16 containing PCM 14 is divided into 6 sections S1, S2, S3, S4, S5, S6, and each section has a dedicated optical fiber or fibres O1, O2, O3 (the remaining are not shown for the sake of clarity).

Figure 3:
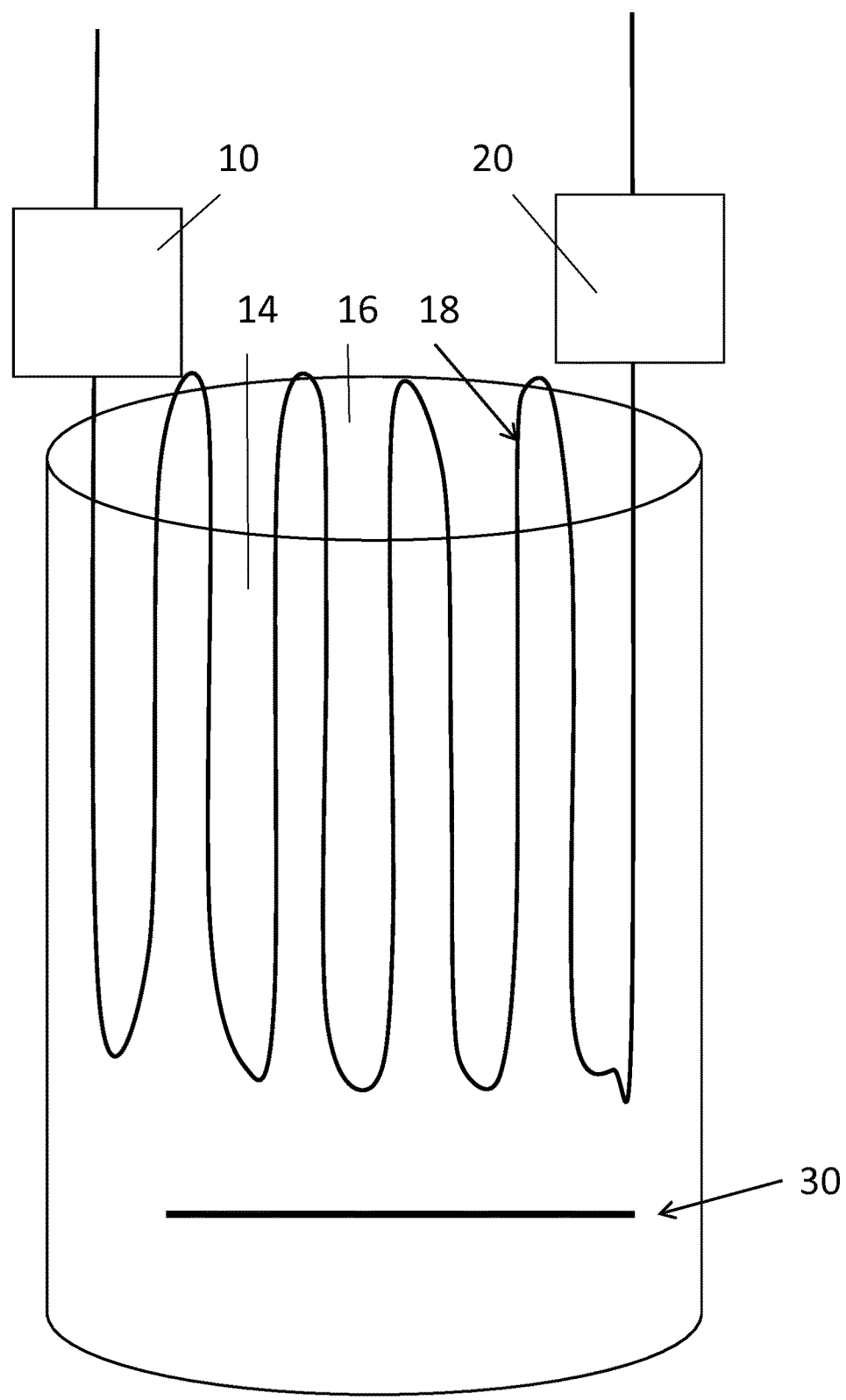
FIG. 3 shows an arrangement of an optical fiber inside a vessel comprising a PCM according to an embodiment of the present invention.

In a first example of an embodiment according to the present invention shown on FIG. 3, at least one optical fiber 18 is arranged inside the vessel 16 containing a PCM 14, wherein the arrangement of the optical fiber comprises sections with a vertical path of the at least one fiber. The vessel 16 has a heating or cooling means 30, such as an electrical heater or a heat exchanger. This shown also in FIGS. 4 to 6.

Figure 4:
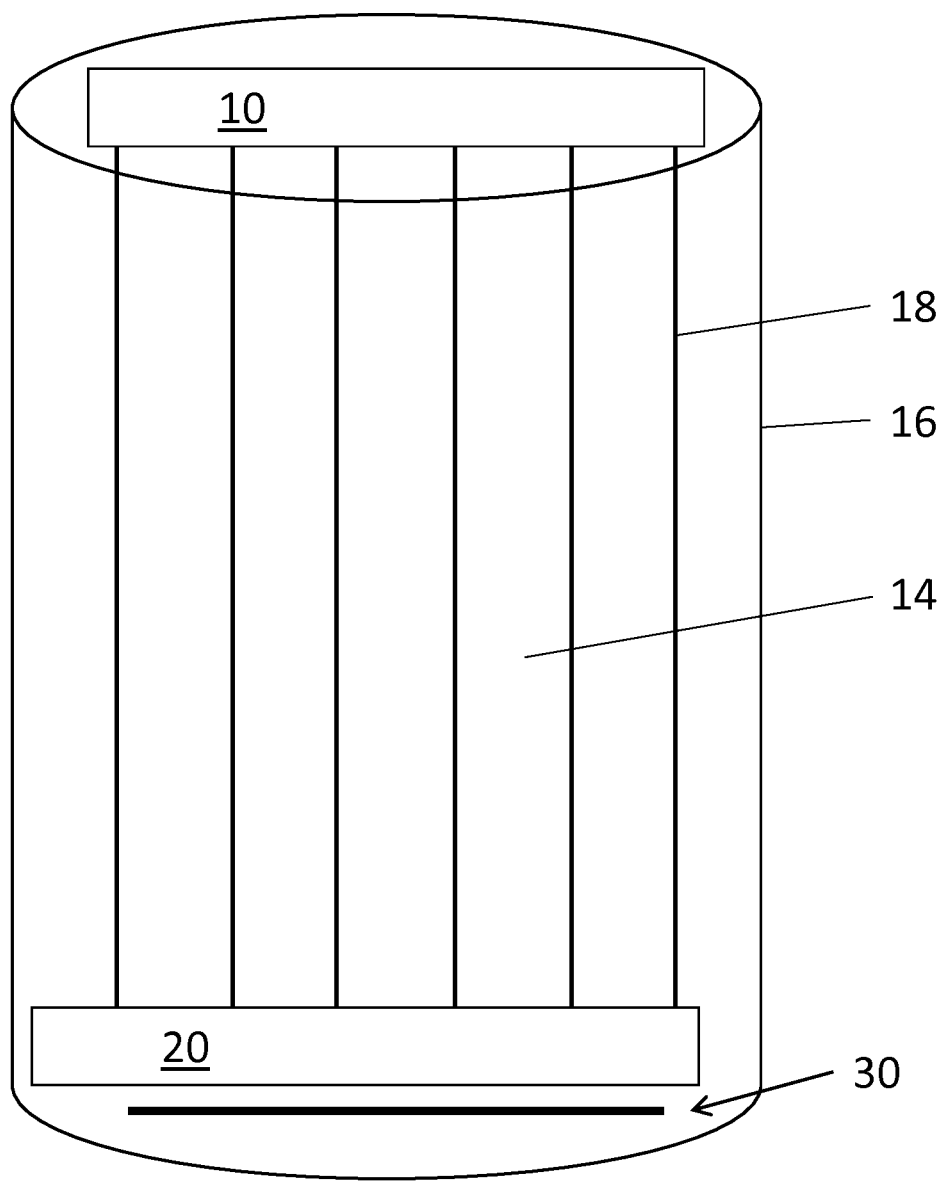
FIG. 4 shows a plurality of optical fibers arranged vertically inside a vessel comprising a PCM according to an embodiment of the present invention.

In a second example shown on FIG. 4, a plurality of optical fibers 18 arranged vertically inside the vessel 16 with PCM 14 are provided.

In these two embodiments, a plurality of sections of optical fibre are provided having the cladding removed so that the core is in direct contact with the PCM. The distribution of the sections inside the vessel can be uniform but can also be adapted to the regions wherein more solid phase accumulate inside the PCM during a phase change.

In an example of an embodiment according to the present invention, in order to provide a plurality of sections where the core is in contact with the PCM and which are uniformly distributed inside the vessel, at least one optical fiber is arranged inside the vessel, in this embodiment cylindrically, by having along the fiber at least one segment having a spiral or helicoidal trajectory in which a section of the optical fiber is removed at a plurality of locations along the segment. Such an example is illustrated on FIG. 5 with two segments of the optical fiber 18 having spiral or helicoidal trajectories within the vessel 16 containing PCM 14, and in which a plurality of sections 12 of the fiber have the cladding removed for the core to be in direct contact with the PCM material. The sections 12 in which the cladding is removed are shown with the circles in FIG. 5.

Increasing the number of sections having the cladding removed and thereby decreasing the distance between removed cladding sections has the effect of increasing the intensity differences obtained between the first phase and the second phase.

The length of the optical fiber and the distance between various sections having the cladding removed does not depend on the dimensions of the vessel. Vessels that can be used with embodiments of the present invention can therefore have multiple shapes and dimensions. Rather, the length of the optical fiber and the distance will depend on the application requirements; more cladding removed (or even a fiber without cladding) or multiple fibres in a vessel will improve accuracy and add spatial resolution, but also result in additional costs.

Figure 5:
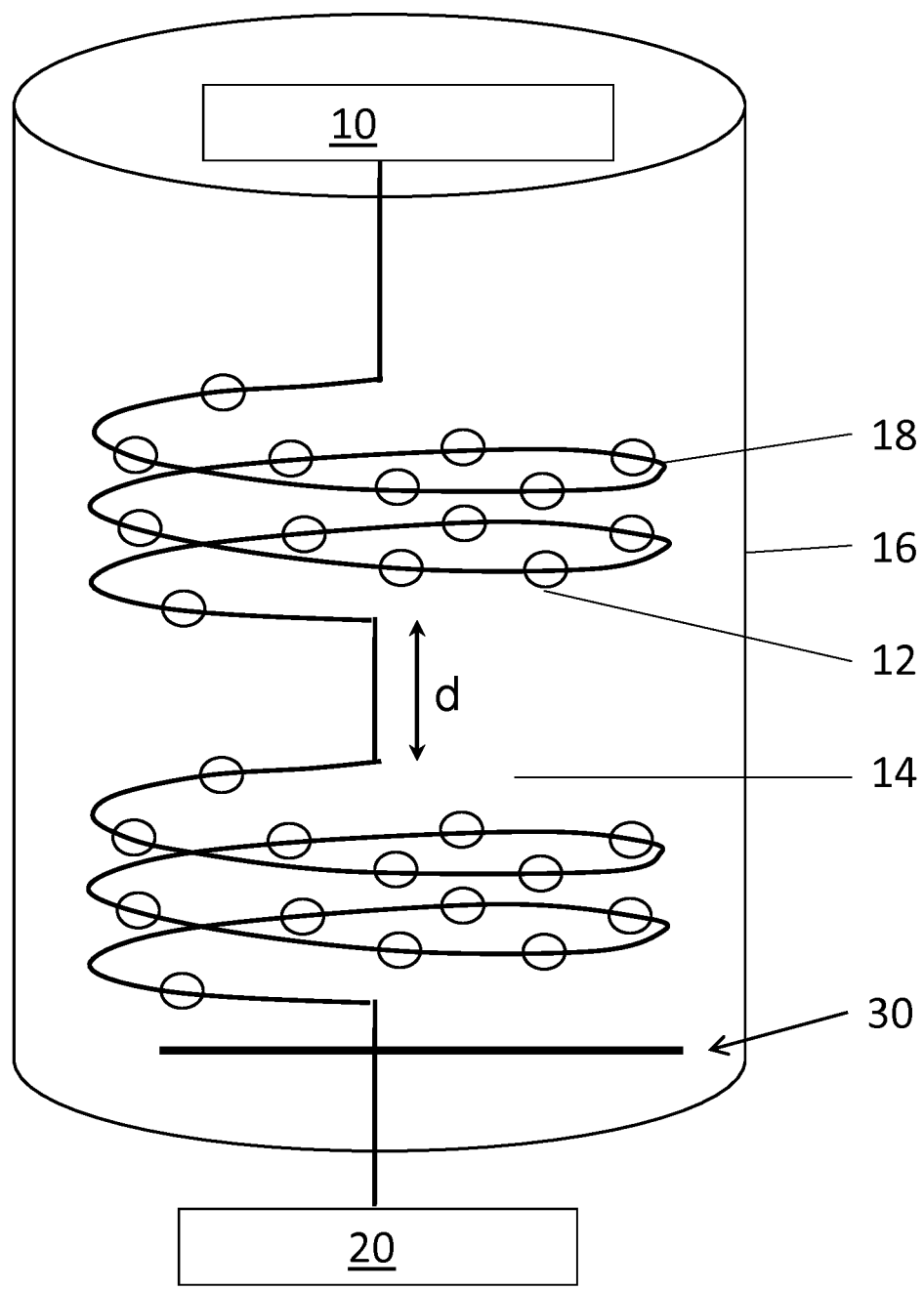
FIG. 5 shows an arrangement of an optical fiber comprising two spiral or helicoidal sections inside a vessel comprising a PCM according to an embodiment of the present invention.
Figure 6:
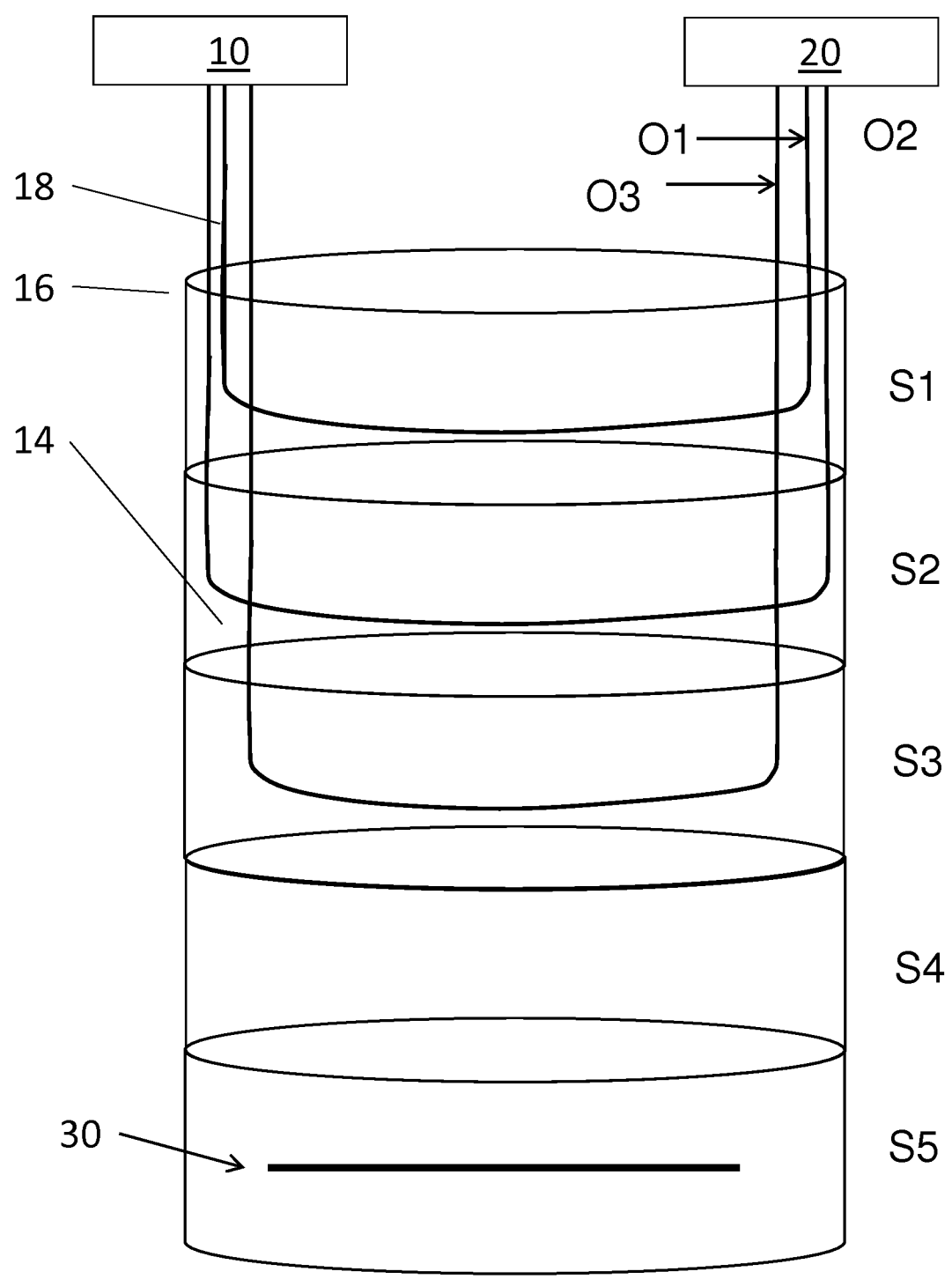
FIG. 6 shows an arrangement of a plurality of optical fibers, each optical fiber being arranged within a section of the vessel defined by its height, according to an embodiment of the present invention.

The distance between two spiral or helicoidal trajectories shown with d on FIG. 5 may also vary. This distance determines the achieved spatial resolution obtained along the trajectory of the optical fiber.

In another embodiment according to the present invention, the vessel is equipped with a plurality of optical fibers having sections with the cladding removed. The use of a plurality of optical fibers ensures that if one fiber is defective, the remaining fibers may still provide measurements of the amount of solid to liquid of the PCM material. The various optical fibers may be arranged throughout the vessel in different manners, such as be parallel to one another in a straight line, have segments having a spiral or helicoidal trajectory, have them perpendicular to one another. Any configuration is possible as long as the segments in direct contact with the PCM material are uniformly distributed inside the vessel. It is also possible to have two or more fibres span the same trajectory but with different claddingless sections. It would then also be possible to reconstruct the position of the volumes that are in the first and second phase. The two fibers should therefore provide different intensities measurements.

Each fiber can be measured to provide a measurement over its length. By increasing the number of fibers, the spatial resolution of the measurements is also improved as the number of trajectories is increased.

In another preferred embodiment, the optical fibers are configured to receive a light beam such as a coherent light beam at a plurality of wavelengths. As the refractive indices are dependent on the wavelengths, at some wavelengths there may be total internal reflections for the solid phase and the liquid phase, at other wavelengths no critical angle for the solid and liquid phases and at others only total internal reflections for the liquid phase. Therefore, using a plurality of wavelengths may be used as means to calibrate the light intensity for all three possibilities, i.e. i) all light is transferred by total internal reflections, ii) light is refracted within the sections having the cladding removed, iii) light is refracted or reflected depending the phase state of the material.

The plurality of wavelengths may be used inside a same optical fiber. In another embodiment according to the present invention, each optical fiber may operate at a different wavelength.

An advantage of using a plurality of wavelengths within a same optical fiber is that it allows to check the structural integrity of a fiber, i.e., for example if in an extreme case, at one wavelength all the light is scattered, the optical detector would receive the minimum light intensity. However, in case of a malfunctioning fiber, due for example to a fracture within the fiber, a minimum light intensity would be measured and it would be impossible to distinguish between the two cases. If however a measurement at a second wavelength provides a high intensity measurement, then the structural integrity of the optical fiber is assured. Thus, changing the wavelength of measurement can also be used as means of checking the structural integrity of the optical fiber.

In a preferred embodiment according to the present invention, the fiber-equipment can be used in combination with at least one temperature sensor. This enables to monitor the temperature further than from the transition point, i.e. the melting point. In fact, when no phase change occurs, changes in refractive index are negligible. Therefore, a temperature sensor may provide this complementary information.

In a preferred embodiment, different parts of the volume, of the vessel comprises a number of one or more temperature sensors for sensing a temperature of the thermal buffering medium contained in each corresponding part. Each part is defined by its height, and the parts are stacked one onto the other. In combination with the preferred stack of parts it has been found that such a configuration allows an improved way of sensing the temperature profile of the thermal buffering medium as the temperature varies substantially only in height direction, considering the vessel is symmetrical. As for the parts, the number of temperature sensors is not limited and can be determined by the person skilled in the art.

The calibration of an optical fiber comprises the following steps.

First, the measurement of the maximal intensity at the output of the fiber is measured by providing a light beam of coherent light at a first wavelength $\lambda$ and intensity I. The first wavelength is chosen such that the refraction index of the core is always higher than the refraction index of the cladding or the PCM material (in the solid phase and the liquid phase).

Then, the measurement of the minimum intensity at the output of the fiber is measured by providing a light beam of coherent light at a second wavelength $\lambda$ and same intensity I. The second wavelength is chosen such that the refraction index of the phase change material is always bigger than the refraction index of the core.

Then, the values of the minimum intensity and maximum intensity for the input intensity I are registered for the measurements of the phase change material.

Preferably, the optical fiber used should be capable of withstanding temperature variations which occur in practice in a PCM vessel. The following optical fibers are suitable for the present invention. Glass fibers for example are capable of operation up to 482° C. or up to 315° C., depending on the materials used. However, these temperatures are well beyond the maximal temperature of paraffin based PCM. For plastic PMMA optical fibers, the maximum temperature of operation is 70° C., as it corresponds to the melting point of PMMA. Thus, such a fiber is not suitable for most PCM. Silica fibers are limited at 315° C., and are thus also suitable for the present application.

This approach will allow a better control of thermal storage techniques using PCM.

In another embodiment according to the present invention, in order to avoid the accumulation of solid PCM around the optical fiber, although the rest of the PCM material comprises liquid phase, the device according to the present invention further comprises a pump for circulating the PCM in the liquid state inside the vessel so as to avoid accumulation of solid particles around the optical fiber. This accumulation of solid particles around the optical fiber would false the readings of the optical measuring means 20.

The present invention is applicable to any type of phase change material, such as water used in ice systems, eutectic salt and paraffin waxes. The melting points of these various PCM are for water 0° C., eutectic salt 8.3° C., and melting points for paraffin waxes are in the range of 51.7° C. and 73.9° C. Thus, paraffin waxes are generally classified into three grades:

Low Melting: 51.7° C. to 57.2° C.,
Mid Melting: 57.2° C. to 62.8° C.,
High Melting: 62.8° C. to 73.9° C.

The present invention is not limited to solid to liquid and liquid to solid changes, however it is the preferred application. In fact, changes from gas to liquid and liquid to gas involve a large volume change which makes the implementation of such a phase change more difficult. However, the present invention applies to all phase changes as the refractive index varies near the phase transition boundary.

It is important to note that the present invention is not limited to phase change materials, although it is the first area of application foreseen. The technique is general enough to be applied to any process showing a temperature dependent refractive index.

Embodiments of the present invention may find advantageous application where control and accurate information is needed on the energy available in the storage units. Thus in general embodiments of the present invention are applicable in households, e.g. thermal buffers, heat and cooling applications in industry and in the context of smart grids.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A heat storage vessel having a device for measuring a state of a phase change material inside the heat storage vessel, the phase change material having a step-wise change of refractive index at change of phase, the vessel comprising:
at least one optical fiber arranged inside the heat storage vessel, said at least one optical fiber having a cladding around a core,
a light source emitting light coupled into a first end of the at least one optical fiber at a wavelength λ,
optical measuring means for measuring the amount of light at the output at a second end of the at least one optical fiber,
wherein the at least one optical fiber comprises one or a plurality of sections with the cladding removed so that at these sections the core is in direct contact with the phase change material inside the vessel and wherein the refractive index at the wavelength of the core is higher than that of the phase change material in a first phase and lower than that of the phase change material in a second phase, the refractive index of the core lying within the step-wise change of refractive index at the phase change,
wherein the plurality of sections having a removed or no cladding of the at least one optical fiber are distributed throughout the heat storage vessel such that the ratio of phase change materials in different phases can be determined by measuring the light intensity at the output of the at least one optical fiber.

2. The heat storage vessel according to claim 1, wherein the phase change material is in the heat storage vessel during operation.

3. The heat storage vessel according to claim 2, wherein the first and second phases are either liquid or solid phases.

4. The heat storage vessel according to claim 1, wherein the optical fiber has no cladding along the trajectory in direct contact with the phase change material.

5. The heat storage vessel according to claim 1 wherein the core is exposed to said phase change material in a plurality of locations distributed throughout the whole volume of the heat storage vessel in order to provide an indication of the state of charge.

6. The heat storage vessel according to claim 1, wherein the sections having a removed cladding are distributed uniformly throughout the vessel.

7. The heat storage vessel according to claim 1, wherein the at least one optical fiber is arranged inside the vessel such that at least one segment of the fiber has a spiral or helicoidal trajectory in which a section of the optical fiber is removed at a plurality of locations along the segment.

8. The heat storage vessel according to claim 1, wherein a plurality of optical fibers are arranged inside the vessel such that each optical fiber measures the amount of liquid to solid within a dedicated section defined by its height so as to measure the amount of liquid to solid as a function of the height within the vessel.

9. The heat storage vessel according to claim 1, wherein the at least one optical fiber is configured to receive a light beam at a plurality of wavelengths and/or wherein each optical fiber of the at least one optical fiber is configured to operate with light sources producing a light beam or beams of different wavelengths.

10. The heat storage vessel according to claim 1, wherein a plurality of temperature sensors are arranged along a vertical line inside the vessel.

11. A method for calibrating a measurement system for optical measurements on a phase change material in a vessel, the phase change material having a step-wise change of refractive index at change of phase, the vessel having at least one optical fiber arranged inside the vessel, said at least one optical fiber comprising a cladding around a core, the at least one optical fiber having a plurality of sections with the cladding removed so that at these sections the core is in direct contact with the phase change material inside the vessel and wherein the refractive index of the core is higher than that of the phase change material when the phase change material is in a first phase and lower than that of the phase change material when the phase change material is in a second phase, the refractive index of the core lying within the step-wise change of refractive index of the phase change material at the phase change, and wherein the plurality of sections having a removed or no cladding of the at least one optical fiber are distributed throughout the heat storage vessel such that the ratio of phase change materials in different phases can be determined by measuring the light intensity at the output of the at least one optical fiber, the method comprising the steps of:

- coupling a light source to an input of the at least one optical fiber,
- measuring a maximal intensity of light emitted at an output of the fiber when the phase change material is all in the first phase state,
- measuring a minimum intensity at the output of the fiber when the phase change material in the vessel is all in a second phase state, and
- storing the minimum and maximum intensity values.

12. The method according to claim 11, wherein the first and second phases are either liquid or solid phases.

13. The method according to claim 11, wherein the optical fiber has no cladding along the trajectory in direct contact with the phase change material.

14. The method according to claim 12, wherein the core is exposed to said phase change material in a plurality of locations distributed throughout the whole volume of the heat storage vessel in order to provide an indication of the state of charge.

15. The method according to claim 11, wherein the at least one optical fiber is configured to receive a light beam at a plurality of wavelengths and/or wherein each optical fiber of the at least one optical fiber is configured to operate with light sources producing a light beam or beams of different wavelengths.

16. A method for calibrating the state of a PCM material in a vessel comprising at least one optical fiber having a cladding around a core and the at least one optical fiber comprising one or a plurality of sections with the cladding removed wherein the sections having a removed or no cladding are distributed throughout the heat storage vessel such that the ratio of phase change materials in different phases can be determined by measuring the light intensity at the output of the at least one optical fiber, the method comprising the steps of:

- measuring a maximal intensity at the output of an optical fiber by providing a light beam of coherent light at a first wavelength and intensity I at the entrance of the optical fiber, wherein said first wavelength is chosen such that the refraction index of a core of the optical fiber is always higher than the refraction index of a cladding of the optical fiber or the PCM material,
- measuring a minimum intensity at the output of the optical fiber by providing a light beam of coherent light at a second wavelength λ and same intensity I at the entrance of the optical fiber, the second wavelength being chosen such that the refraction index of the phase change material is always larger than the refraction index of the core,
- storing the minimum and maximum intensity values as a function of the intensity I.

17. The method according to claim 16, wherein the first and second phases are either liquid or solid phases.

18. The method according to claim 16, wherein the optical fiber has no cladding along the trajectory in direct contact with the phase change material.

19. The method according to claim 16, wherein the core is exposed to said phase change material in a plurality of locations distributed throughout the whole volume of the heat storage vessel in order to provide an indication of the state of charge.

20. The method according to claim 16, wherein the at least one optical fiber is configured to receive a light beam at a plurality of wavelengths and/or wherein each optical fiber of the at least one optical fiber is configured to operate with light sources producing a light beam or beams of different wavelengths.

* * * * *